Feb. 5, 1946. S. E. HILBLOM 2,394,057
HAY RAKE
Filed Dec. 27, 1943 2 Sheets-Sheet 1
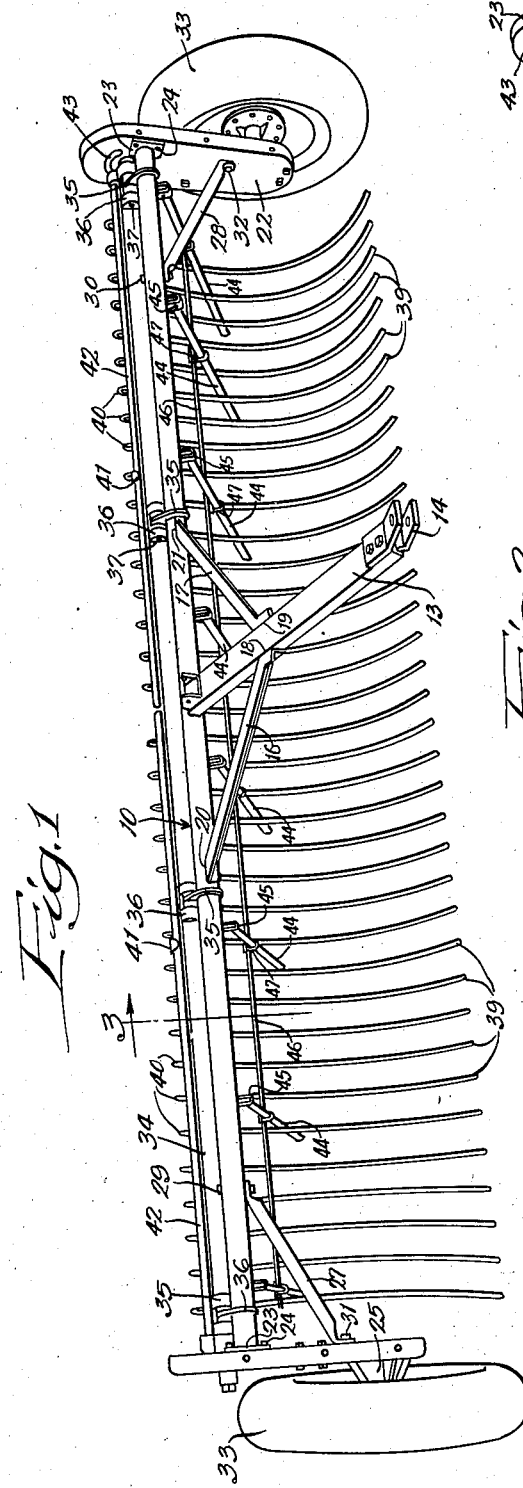
Inventor.
Samuel E. Hilblom
By Paul O. Pippel
Attorney.

Feb. 5, 1946. S. E. HILBLOM 2,394,057
HAY RAKE
Filed Dec. 27, 1943 2 Sheets-Sheet 2
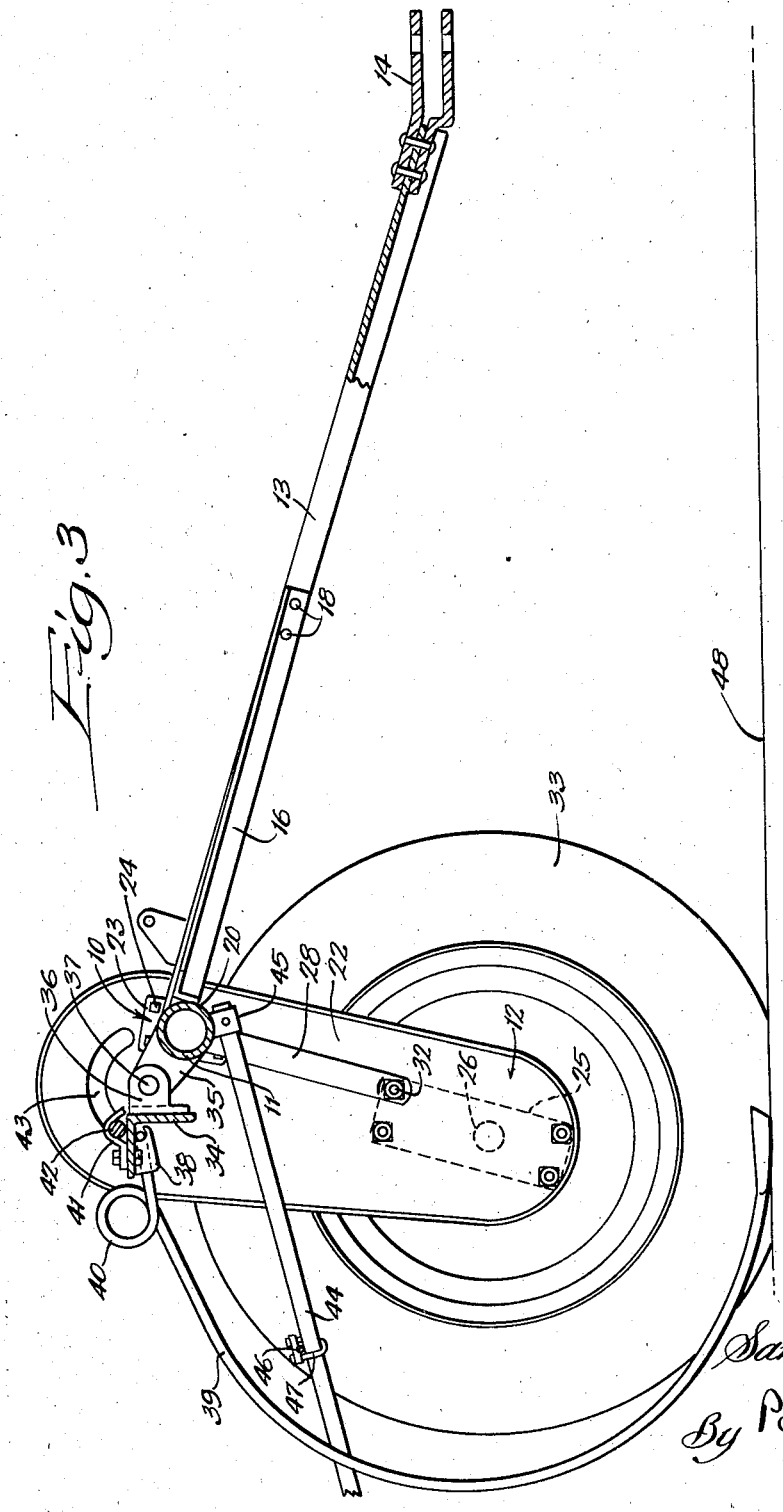
Inventor:
Samuel E. Hilblom
By Paul O. Pippel
Attorney.

Patented Feb. 5, 1946

2,394,057

UNITED STATES PATENT OFFICE 2,394,057

HAY RAKE

Samuel E. Hilblom, Chicago, Ill., assignor to International Harvester Company, a corporation of New Jersey Application December 27, 1943, Serial No. 515,684

1 Claim. (Cl. 56—384)

This invention relates to hay rakes and more particularly to the dump type hay rake.

An important object of this invention is to provide a rake mounted on relatively small wheels to enable use of such a rake in places, such as orchards, where previously manufactured high wheel rakes were unable to travel.

Another important object of this invention is to provide a dump hay rake which is capable of using a standard size wheel. At the present time the majority of agricultural implements are equippel with pneumatic tires, and it is desired to have a hay rake which will be able to utilize standard size wheels and tires.

Another and further important object of the present invention relates to a rigid supporting frame for a dump type hay rake and further to provide a rake head capable of more quickly resuming its raking position after having been dumped.

A still further important object of this invention is to provide a rigid arched frame for a hay rake having a unitary hitch.

Another and still further important object of the invention is to provide a low-wheeled hay rake having a torque tube at a point above the wheel axles.

Other and further important objects of the invention will become apparent from the following detailed description and accompanying sheets of drawings, in which:

Figure 1 is a perspective view of the hay rake of this invention;

Figure 2 is a perspective view of the hay rake frame; and

Figure 3 is a sectional view taken on the line 3 of Figure 1.

Referring to the drawings, reference numeral 10 indicates generally a rake frame having a transverse beam-like torque tube 11 and depending axle housings 12 at each end thereof which hold and enclose rake drive members (not shown). The central part of the torque tube or beam 11 has rigidly affixed thereto a tongue 13 having a clevis 14 at its forward end adapted to hitch to a draft vehicle. The rear end of the tongue 13 is welded or otherwise attached to the torque tube 11 at 15. Brace members 16 and 17 are adapted to reenforce this tongue 13 and are welded or otherwise fastened to the tongue at 18 and 19, respectively, and to the torque tube 11 at 20 and 21, respectively.

The torque tube 11 is rigidly affixed to inner plates 22 of the depending housings 12. The ends of the torque tube 11 are equipped with flanges 23 and are fastened by means of bolts or the like 24 to the inner plates 22 of the depending axle housings 12. Bearing brackets 25 are affixed to the outer sides of the inner plates 22 and are adapted to journally support stub wheel axles 26. The depending housings are reenforced by means of brace members 27 and 28 rigidly fastened by means of bolts or the like 29 and 30, respectively, to the torque tube 11. The lower ends of the inclined brace members 27 and 28 are bolted or otherwise attached to the inner faces 22 of the depending housings 12 at 31 and 32, respectively.

The majority of presently used rakes are equipped with high wheels so that their centers are sufficiently high to have the rake teeth or tines depending directly therefrom. In the present instance, however, wheels 33 mounted on the axles 26 are not nearly high enough to have the rake depend from their axles, and, therefore, an arched frame is employed wherein an angle bar rake head 34 is transversely mounted considerably above the axles 26 of the implement and at approximately the same height as the torque tube 11 and slightly to the rear thereof, as best shown in Figure 3. The torque tube 11 is equipped with rearwardly extending hinge members 35 at substantially regular intervals along the length of the tube. Complementary hinge members 36 are mounted integrally with the vertical flange of the rake head angle bar 34 and project forwardly thereof to a point where hinge pins 37 may be positioned through alined apertures in the hinge members 35 and 36.

A supporting bracket 38 is mounted beneath the rearwardly extending flange of the rake head angle bar 34 and is adapted to support rake tines 39, as shown in Figures 1 and 3. The rake tines are equipped with a coil spring 40 intermediate their top and bottom portions and, therefore, possess considerable resiliency. On top of the angle iron 34, brackets 41 are bolted or otherwise fastened which hold the centrally divided dumping actuator rods 42 in position with respect to the angle bar 34. The rods 42 are adapted to project through arcuate slots 43 in the inner plates 22 of the depending housings and engage the drive elements (not shown).

In dumping the rake, the rod members 42 are adapted to travel in these arcuate slots 43 and carry with them the rake head angle iron 34 and also the rake teeth 39. The rake head moves arcuately upwardly about the hinge pins 37. In prior dump rakes, the rake head 34 was rotated about its own axis in order to dump the rake.

In the present construction the rake head 34, in conjunction with the hinge members 36, forms a work arm around the hinge pins 37, and, when the rake is released after dumping its load, this work arm is adapted to return the rake tines 39 to their operative raking position adjacent the ground more quickly than if the rake head 34 were merely pivoted about its own axis. The torque tube 11 and the housings 12 remain stationary when the rake head is revolving to dump the hay rake.

Stripper bars 44 are mounted beneath the torque tube 11 at 45 and are joined together by means of the rod 46 to which the bars 44 are shackled as at 47. These stripper bars 44 remain in fixed position relative to the ground line 48, and when the rake teeth 39 are raised upwardly, the hay in the rake is thereby extruded by these stripper bars.

It is believed that herein is provided a novel hay rake, and that the particular positioning of the torque tube 11 with respect to the depending housings 12 combines to provide a hay rake of simple, light weight with strength sufficient to withstand all usages. The rake head 34 is not positioned centrally of the depending housings 12 but rather is positioned to the rear of said housings and has its pivot point on the center line of the housings 12 intermediate the torque tube and the head 34.

The intention is to limit the invention only within the scope of the appended claim.

What is claimed is:

A hay rake having a frame comprising, a transverse torque tube, a draft tongue attached centrally of and at right angles to said torque tube, brace members diagonally positioned between said torque tube and an intermediate point on said tongue, hollow housings depending at right angles from each end of said torque tube adapted to enclose drive elements, brace members inclined between said torque tube and said housings, wheels supported by stub axles journaled on said housings at their lower ends, a rake head positioned rearwardly and substantially at the same horizontal level with said torque tube, hinge members extending rearwardly of said torque tube, cooperative hinge members projecting forwardly of said rake head, and hinge pins joining said hinge members, whereby said rake head is hingedly movable relative to said torque tube said housing having arcuate slots in their inner faces, and extensions on each end of said rake head adapted to enter said slots and be permitted partial rotation through the said arcuate slots for dumping said hay rake.

SAMUEL E. HILBLOM.